United States Patent [19]

Jarocha et al.

[11] 4,110,732
[45] Aug. 29, 1978

[54] TIRE PRESSURE MONITOR

[75] Inventors: William M. Jarocha, Farmington; Walter K. O'Neil, Southfield, both of Mich.

[73] Assignee: Eaton Corporation, Cleveland, Ohio

[21] Appl. No.: 768,911

[22] Filed: Feb. 15, 1977

[51] Int. Cl.$^2$ .............................................. B60C 23/00
[52] U.S. Cl. ....................................... 340/58; 303/95;
361/244; 361/203; 324/83 R; 167
[58] Field of Search .......... 340/58, 52 B, 170, 258 C,
340/271, 253 Y; 303/95, 96, 106, 109; 310/168
R; 324/166, 123, 83 R, 83 A, 83 D, 33 A, 34 D,
34 PS, 167; 307/233 B; 361/242, 244, 203

[56] References Cited

U.S. PATENT DOCUMENTS

| | | | |
|---|---|---|---|
| 3,206,641 | 9/1965 | Leeson | 361/244 |
| 3,525,103 | 8/1970 | McCune | 303/96 |
| 3,665,387 | 5/1972 | Enabnit | 340/58 |
| 3,911,934 | 10/1975 | Cook | 340/58 |
| 3,990,041 | 11/1976 | Blanchier | 340/58 |

*Primary Examiner*—John W. Caldwell, Sr.
*Assistant Examiner*—Donnie L. Crosland
*Attorney, Agent, or Firm*—F. M. Sajovec, Jr.

[57] ABSTRACT

Low pressure in a vehicle tire is detected by an electronic system which compares the difference in phase between two cyclic signals and produces an output signal having a negative going pulse and a positive going pulse for each revolution of the tire. Each negative going pulse represents a decrease in phase between the two signals and is generated in response to a shorted coil passing through an electromagnetic field produced by an induction coil in a parallel resonant circuit which produces the second of the two signals. The first signal is produced by an oscillator and is used to excite the resonant circuit and as a reference signal. The coil is shorted by a closed switch in the tire when the pressure is normal. Abnormal tire pressure opens the switch and renders the coil ineffective. Each positive going pulse represents an increase in phase between the two signals and is generated in response to a ferrous metal plate passing through the field. A logic circuit includes a capacitor charged at a fixed rate and operative to activate a warning light when the capacitor charge exceeds a predetermined level. When the tire speed is above 5 mph, the negative going pulses cause the capacitor to discharge faster than it is charged. When the vehicle speed is below 5 mph, a low speed inhibit circuit responsive to the positive going pulses discharges the capacitor faster than it is charged.

8 Claims, 2 Drawing Figures

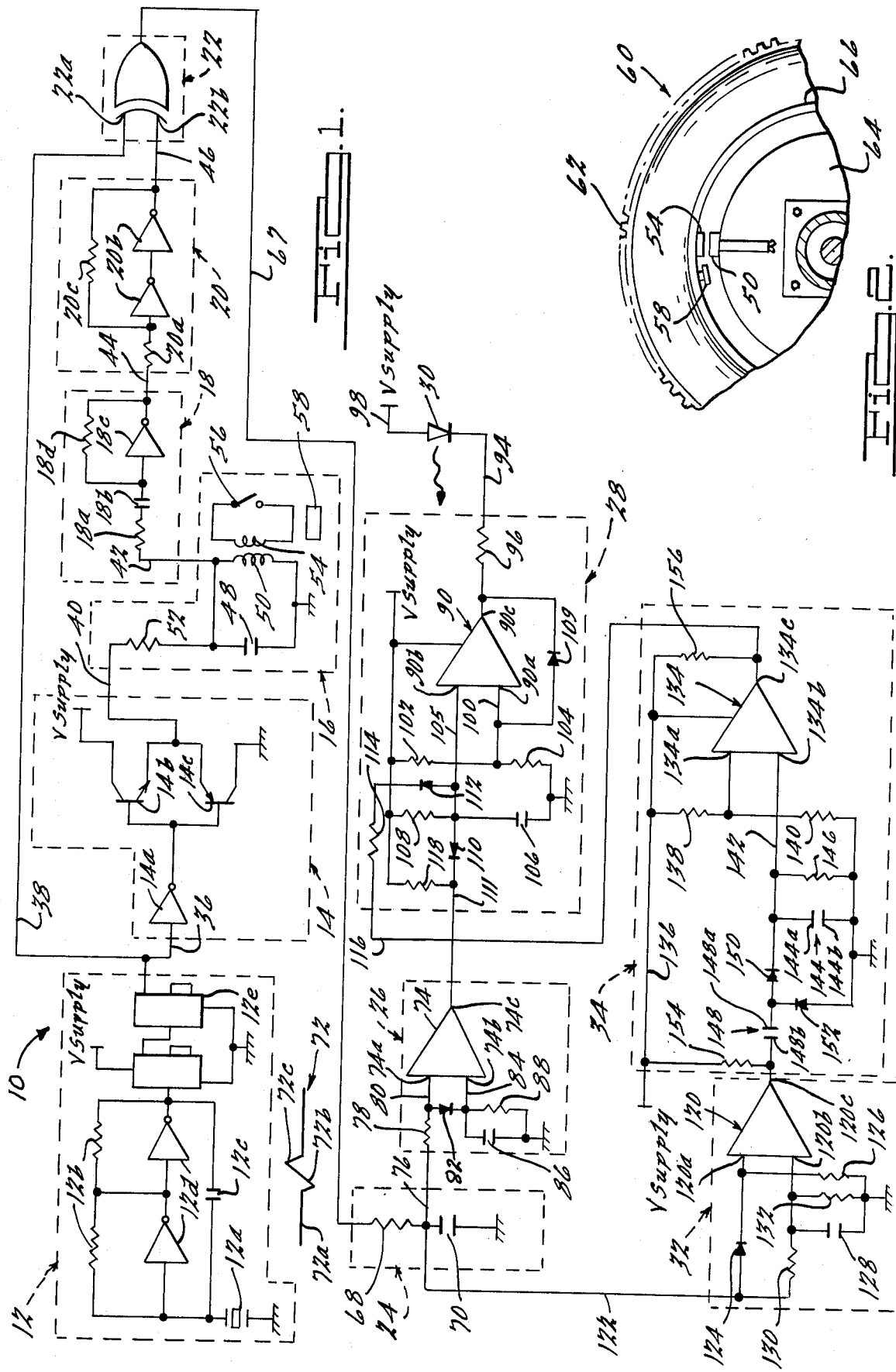

TIRE PRESSURE MONITOR

BACKGROUND OF THE INVENTION

1. Cross-Reference

This application relates to a pending application Ser. No. 768,928 filed Feb. 15, 1977 and application Ser. No. 768,810 filed Feb. 15, 1977, now U.S. Pat. No. 4,072,927 and both assigned to the assignee of this application.

2. Field of the Invention

The invention relates to an electronic circuit for detecting phase differences between two cyclic signals and more specifically to such a circuit for monitoring the condition of a pneumatic tire for a vehicle.

3. Description of the Prior Art

The tire pressure monitoring system in application Ser. No. 768,810, now U.S. Pat. No. 4,072,927 employs a tire pressure operated switch which is open when the tire pressure is normal and which is closed when the pressure is abnormal; hence, it is difficult to check the condition of the circuit and the switch contacts when the tire pressure is normal. Further, the system, as disclosed, is incapable of providing a wheel speed signal.

SUMMARY OF THE INVENTION

An object of the invention is to provide an electronic system for detecting a change in condition of a rotating object, wherein the condition of the system is easily checked for proper operation.

Another object of the invention is to provide such a system which also provides a signal representative of the angular velocity of the rotating object.

The objects are realized by an electronic circuit including an oscillator producing a first cyclic signal; a resonant circuit producing a second cyclic signal which is shifted in phase in one direction to indicate a normal condition of the rotating object and which is shifted in the other direction to provide a signal representative of the angular velocity of the rotating object; a normally closed switch which opens and terminates the phase shifts in the one direction when the condition changes from normal to abnormal; and a logic circuit which activates a warning device when the phase shifts in the one direction are terminated and the phase shifts in the other direction continue.

BRIEF DESCRIPTION OF THE DRAWING

The preferred embodiment of the invention is shown in the accompanying drawing in which:

FIG. 1 illustrates an electronic system for detecting a low pressure condition of a pneumatic tire and the angular velocity of the tire; and FIG. 2 illustrates one way a portion of the system may be mounted on a wheel of a vehicle.

DETAILED DESCRIPTION OF THE DRAWING

Referring now to FIG. 1, therein is shown a detailed illustration of an electronic system or circuit 10 for detecting momentary phase shifts between two cyclic signals. A phase shift or shifts in one direction indicates that the condition of a rotating object is normal. A phase shift in the other direction indicates that the object is rotating. The rate of occurrence of the phase shifts in the other direction also represents the angular velocity of the vehicle. Circuit 10, as described herein, is operative to detect a change in condition of a pneumatic tire and is operative to provide a wheel speed signal representative of the angular velocity of the wheel or the velocity of a vehicle supported by the wheel. The circuit 10 is easily modified to detect only the change in condition or to only detect the speed of a wheel. Many different changes in condition of a rotating object or tire may be detected by circuit 10; herein, low pressure of the tire is detected.

The principal components and circuitry of circuit 10 are enclosed in dashed lined boxes which comprise a square wave oscillator 12, a square wave buffer and driver 14, a parallel resonant circuit 16, an amplifier 18, a zero crossing detector and a squarer 20, a phase shift detector 22, a smoothing circuit 24, a negative pulse detector 26, a logic circuit 28, a warning light 30, a positive pulse detector 32, and a low speed inhibit circuit 34.

Oscillator 12 comprises a 210 KHZ ceramic resonator 12a marketed by Radio Materials Corporation, two 100 K resistors 12b, a 120 pf capacitor 12c, two inverters 12d marketed by National Semiconductor under part number MM74C04, and a dual D flip-flop 12e marketed by RCA under part number CD4013. Buffer and driver 14 comprises an inverter 14a identical to inverters 12d and two transistors 14b and 14c marketed by Motorola under part numbers 2N4400 and 2N4402, respectively. Amplifier 18 comprises a 51 K resistor 18a, a 680 pf capacitor 18b, an inverter 18c identical to inverters 12d, and a 2 M resistor 18d. Zero crossing detector and squarer 20 comprises a 100 K resistor 20a, two inverters 20b identical to inverters 12d and 1 M resistor 20c. Phase shift detector 22 is an exclusive-or gate marketed by RCA under part number CD 4070. The remaining circuitry includes several comparators and diodes. The comparators are marketed by National Semiconductor under part number LM 2901, and the diodes are marketed under part number 1N1702. Warning light 30 is a light emitting diode (LED) marketed by Hewlett Packard under part number HP5082-7650.

Oscillator 12 produces a first cyclic signal which is connected to driver 14 via a line 36 and to an input terminal 22a of detector 22 as a reference signal via a line 38. Resonant circuit 16 is connected to driver 14 via a line 40, is driven or excited by the current signal from the driver, and is operative to produce a second cyclic signal whose voltage is shiftable in phase relative to the phase of the voltage of the first signal. Amplifier 18 is connected to the output of the resonant circuit via a line 42 and is operative to amplify the second signal. Squarer 20 is connected to amplifier 18 via a line 44 and is operative to square or reshape the second signal before it is applied to a terminal 22b of detector 22 via a line 46. Detector 22 is an exclusive-or gate which produces an output signal having a duty cycle portion representative of the phase difference between the first and second cycle signals. The width of the duty cycle portion decreases when the phase difference between the two signals decreases and increases when the phase difference there between increases.

Resonant circuit 16 includes capacitive and inductive reactive elements 48 and 50 which are excited by the signal on line 40 via a damping resistor 52. Resistor 52 allows the second cyclic signal or voltage signal resonating between the reactive elements to shift in phase relative to the reference voltage signal produced by the oscillator whenever the effective impedance of either or both of the reactive elements is charged. Herein, the reactive elements are connected in parallel; however, they may be connected in series.

Reactive element 48 is a conventional capacitor, and inductor element 50 may be a coil comprising about 50 wraps of 25 gauge copper wire (not shown) wound on a spool or bobbin (not shown) having an I.D. of about 0.375 inches and an O.D. of about 0.800 inches, and a thickness of about 0.125 inches. Coil 50 produces, in a well known manner, an electromagnetic field composed of lines of induction extending substantially parallel to the axis of the bobbin.

The effective impedance of coil 50 and hence, the effective impedance of the resonant circuit, is changed in one direction by a coil 54 which is electrically connected to a switch 56 and is changed in the other direction by a metal plate 58 which may be made of a magnetic material. Coil 54 may be wound of ferrous or nonferrous wire, and plate 58 may be ferrous or nonferrous. Herein, coil 54 is wound of copper wire and is of the same construction as coil 50, and plate 58 is made of a ferrous metal.

The values of capacitor 48, inductor 50, and resistor 52 may be selected so that the second signal or voltage signal of the resonant circuit can lead, lag or be in phase with the reference signal. Herein, the values are selected so that the signal lags the first or reference signal by 30 to 40 degrees when the impedance of the resonant circuit is uneffected by coil 54 and plate 58.

Looking now at FIG. 2, therein is shown coils 50 and 54 and plate 58 mounted on a vehicle wheel assembly 60 for detecting a change in pressure of a pneumatic tire 62 and rotation of the tire. Coil 50 is fixed to a nonrotating part 64 of the vehicle and is connectable to the resonant circuit via the wires protruding downward therefrom. Coil 54 and plate 58 are fixed to a wheel rim 66 and both pass through the electromagnetic field produced by coil 50. Coil 54 is electrically connected to switch 56 (not shown in FIG. 2) mounted in the tire and controlled by a pressure operated device (not shown) which opens the switch and hence opens the coil when the tire condition or pressure becomes abnormal; i.e., falls below a predetermined amount. The device closes the contacts and hence, shorts the coil when the pressure is normal. Such pressure operated devices are well known. Several of plates 58 may be disposed at equal distances about rim 66, or the plates may be replaced by slotted or ripple type rotors, such as used in vehicle skid control systems.

Passage of coil 54 through the electromagnetic field when the coil is shorted, i.e., when the pressure is normal, decreases the effective impedance of the resonant circuit and decreases the phase difference of the second signal relative to the first signal, thereby decreasing the width of the duty cycle portion of the output signal of detector 22. Coil 54 has substantially no effect on the impedance when it is opened by an abnormal tire pressure condition. Passage of plate 58 through the field increases the effective impedance of the resonant circuit and increases the phase difference of the second signal relative to the phase of the first signal, thereby increasing the width of the duty cycle portion of the output signal of detector 22.

Looking again at FIG. 1, smoothing circuit 24 is connected to the output of detector 22 via a line 67 and includes a 10 K resistor 68 and 0.022 uf capacitor 70 for smoothing or averaging out the voltage value of the duty cycle portion of the output signal. An oscilloscope trace 72 represents the output voltage of the smoothing circuit. The flat portion 72a of the trace represents the average voltage of the duty cycle portion when neither coil 54 nor plate 58 are effecting the impedance of the resonant circuit. The negative going pulse 72b represents a momentary decrease in the phase difference between the first and second signals and is caused by coil 54 passing through the electromagnetic field when it is shorted by the closed contacts of the switch. The negative going pulse is terminated when coil 54 is opened by switch 56. The positive going pulse 72c represents a momentary increase in the phase difference between the first and second signals and is caused by plate 58 passing through the electromagnetic field.

The negative pulse detector 26 includes a comparator 74 having input terminals 74a and 74b and an output terminal 74c. Terminal 74a is connected to the output of smoothing circuit 24 via a line 76, a 100 K resistor 78, and a line 80. Terminal 74b is connected to line 80 via a diode 82 and a line 84, which line 84 is also connected to a RC circuit having a 10 uf storage capacitor 86 and a 1 M bleed resistor 88. Diode 82 allows capacitor 86 to accumulate a floating reference charge from line 80 and blocks an abrupt discharge of the capacitor in response to the negative going pulses from the smoothing circuit. Hence, terminal 74b remains high and terminal 74a momentarily goes low in response to each negative going pulse. Each momentary low at terminal 74a switches the comparator from a high impedance output to a low impedance output.

Logic circuit 28 includes a comparator 90 having input terminals 90a and 90b and an output terminal 90c connected to the warning light 30 via a line 94 and a 620 ohm resistor 96. Warning light 30 may be a light emitting diode and is connected to the voltage supply via a line 98. Input terminal 90a is connected to the voltage supply via a line 100 and a voltage divider including a 20 K resistor 102 and a 100 K resistor 104. Input terminal 90b is connected via a line 105 to a RC circuit including a 4.7 uf capacitor 106 which is charged at a predetermined rate by the voltage supply through a 1 M resistor 108. Capacitor 106 is operative to switch comparator 90 from a high impedance output to a low impedance output when its charge level or voltage (and therefore the voltage at terminal 90b) exceeds the voltage on terminal 90a. This low impedance output provides a grounding path for illuminating and activating the warning light. The output of the comparator is clamped low by a diode 109 once the comparator is switched low. Capacitor 106 is connected for discharging purposes to the output of comparator 74 via a diode 110 and a line 111 and is also connected for discharging purposes to the output of the low speed inhibit circuit 34 via a diode 112, a 360 K resistor 114, and a line 116. When the tire pressure is normal, the output of comparator 74 switches momentarily low in response to each negative going pulse 72b and provides a momentary grounding path for discharging capacitor 106. This momentary grounding path discharges the capacitor faster than it can be charged through resistor 108 when the angular velocity of the wheel is great enough. Herein, an angular velocity corresponding to a vehicle speed of 5 mph will provide a negative pulse rate great enough to keep the capacitor voltage below the voltage on terminal 90a. A 2 K resistor 118 provides a current to insure sharp switching of comparator 74.

The positive pulse detector 32 includes a comparator 120 having input terminals 120a and 120b and an output terminal 120c. Input terminal 120a is connected to the output of smoothing circuit 24 via a line 122 and a diode 124. A 100 K bleed resistor 126 connects terminal 120a to ground to prevent inadvertent switching of the comparator. Terminal 120b is connected to a RC circuit including a 47 uf capacitor 128 which is charged through a 100 K resistor 130 connected to line 122 and which is discharged through a 2 M bleed resistor 132. Each positive pulse from the smoothing circuit causes the voltage on terminal 120a to momentarily become higher than the voltage on terminal 120b and thereby momentarily switch the comparator from a high impedance output to a low impedance output.

The low-speed inhibit circuit 34 includes a comparator 134 having input terminals 134a and 134b and an output terminal 134c connected via line 116 to capacitor 106. Comparator 134 is operative to switch from a high impedance output to a low impedance output for discharging capacitor 106 and disabling the logic circuit when the positive pulses fall below a rate corresponding to a vehicle speed of 5 mph or a wheel angular velocity corresponding to such a vehicle speed. Comparator 134 switches low when the voltage on terminal 134a is greater than the voltage on terminal 134b. Terminal 134a is connected to the voltage supply via a line 136 and a voltage divider which includes a 150 K resistor 138 and a 100 K resistor 140. Terminal 134b is connected via a line 142 to a plate 144a of a 4.7 uf capacitor 144 having the other plate 144b connected to ground. Plate 144a is also connected to ground via a 750 K bleed resistor 146, and to a plate 148a of a 0.47 uf capacitor 148 via a diode 150 which allows only positive charges to flow from plate 148a to plate 144a to thereby increase the positive charge on plate 144a and hence, the voltage across capacitor 144. Plate 148a is also connected to ground via a diode 152 which allows only positive charges to flow from ground to plate 148a, whereby capacitor 148 may be discharged when the output of comparator 120 switches low. The other plate 148b of capacitor 148 is connected to the output of comparator 120 for discharging purposes and to the voltage supply via a 1 K resistor 154 for charging purposes. Each time comparator 120 switches from low to high, plate 148b positively charges through resistor 154 and plate 148a negatively charges by pushing positive charges through diode 150, whereby the voltage across capacitor 144 increases if the charging pulse rate exceeds the discharging rate of bleed resistor 146. Herein, the charging pulse rate exceeds the discharge rate of the bleed resistor when the vehicle speed exceeds 5 mph, whereby the voltage across capacitor 144 and hence, the voltage on terminal 134b will increase to a value great enough to switch the comparator from the low impedance output disabling the logic circuit to the high impedance output enabling the logic circuit. A 1 K resistor 156 provides a current to insure a sharp switching of comparator 134.

Circuit 10 as disclosed monitors pressure for one tire of a vehicle. The circuit is easily expanded to provide monitoring for different conditions and/or for additional wheels without duplication of the whole circuit. For example, oscillator 12 can provide a reference signal for several phase shift detectors by connecting into line 38, driver 14 can provide excitation for several resonant circuits by connecting into line 40, and low speed inhibit circuit 34 can be used to control several logic circuits by connecting into line 116. Further, the signal from phase shift detector 22, or from smoothing circuit 24, or from comparator 120, may be used as a speed signal for tachometer systems, cruise control systems, skid control systems, etc.

The preferred embodiment of the invention has been disclosed for illustration purposes. Many variations and modifications of the preferred embodiment are believed to be within the spirit of the invention. For instance, digital logic techniques may be employed to detect the phase shifts of the resonant circuit. The following claims are intended to cover the inventive portions of the preferred embodiment and variations and modifications believed to be within the spirit of the invention.

What is claimed is:

1. An electronic system for detecting rotation and a change in condition of a pneumatic tire mounted for rotation about an axis, said system comprising:
   means for producing a first cyclic signal;
   a resonant circuit including reactive means and having an effective impedance, said resonant circuit excited by said first cyclic signal and operative to produce a second cyclic signal shiftable in phase relative to said first signal in response to changes in the effective impedance of said resonant circuit;
   first and second means disposed to pass in close proximity of said reactive means in response to rotation of said tire, said first and second means respectively operative when passing said reactive means to momentarily change the effective impedance of said resonant circuit in opposite directions for effecting a momentary phase shift of said second signal in one direction and then in the other direction;
   means for rendering said first means ineffective to change said effective impedance, and thereby terminate the phase shifts in said one direction, in response to said change in condition of said tire; and
   control means operative to activate a warning device indicating said change in condition in response to termination of said phase shifts in said one direction and continuation of said phase shifts in said other direction.

2. The system of claim 1, wherein said base shifts have a rate of occurrence determined by the rotational speed of said tire and wherein said control means includes:
   capacitor means charged at a predetermined rate and operative to activate said warning device when charged to a predetermined level;
   means for discharging said capacitor faster than said charging rate in response to the rate of occurrence of said phase shifts in said one direction exceeding a predetermined rate; and
   means for discharging said capacitor faster than said charging rate in response to the rate of occurrence of said phase shifts in said other direction being below a predetermined rate, whereby said rate of occurrence of said phase changes in said other direction represent the angular velocity of said tire.

3. The system of claim 1, wherein said reactive means includes an inductor producing an electromagnetic field, said first means includes a coil disposed to pass through said field in response to said rotation and a switch electrically connected to said coil and operative when open to render said coil ineffective in response to said condition changing from normal to abnormal, and said second means includes at least one metallic object disposed to pass through said field in response to said rotation.

4. An electronic system for detecting rotation and a condition change of a pneumatic tire mounted for rotation about an axis, said system comprising:
   means for producing a first cyclic signal;

a parallel resonant circuit excited by said first cyclic signal and including an inductor producing an electromagnetic field, said resonant circuit excited by said first cyclic signal and operative to produce a second cyclic signal shiftable in phase relative to said first signal in response to changes in the effective impedance of said resonant circuit;

a coil disposed to pass through said field in response to rotation of said tire, said coil operative to change said effective impedance and shift the phase of said second signal in one direction when said condition of said tire is normal;

means for rendering said coil ineffective to change said effective impedance and shift said phase in said one direction in response to said condition changing to abnormal;

metallic means disposed to pass through said field in response to said rotation and operative to change said effect impedance and shift said phase in said other direction; and control means operative to activate a warning device indicating said abnormal condition in response to termination of said phase shifts in said one direction and continuation of said phase shifts in said other directions.

5. The system of claim 4, wherein said control means includes:
a low speed inhibit circuit operative to prevent activation of said warning device in response to the rate of occurrence of said phase shifts in said other direction being below a predetermined rate.

6. The system of claim 4, wherein said control means includes:
a logic circuit operative to activate said warning device in response to the rate of occurrence of said shifts in said one direction exceeding a predetermined rate.

7. The system of claim 4, wherein said control means includes:
circuit means operative to produce an output signal which momentarily pulses in one direction in response to said momentary phase shifts in said one direction and which momentarily pulses in the other direction in response to said momentary phase shifts in said other direction;

a low speed inhibit circuit operative to switch from an enabling state to a disabling state in response to the rate of occurrence of said pulses in said other direction being below a predetermined rate; and a logic circuit operative to activate said warning device when said inhibit circuit is in said enabling state and in response to termination of said pulses in said one direction.

8. The system of claim 4, wherein said control means includes:
capacitor means charged at a predetermined rate and operative to activate said warning device when charged to a predetermined level;

means for discharging said capacitor faster than said charging rate in response to the rate of occurrence of said phase shifts in said one direction exceeding a predetermined rate; and means for discharging said capacitor faster than said charging rate in response to the rate of occurrence of said phase shifts in said other direction below a predetermined rate.

* * * * *

UNITED STATES PATENT AND TRADEMARK OFFICE
CERTIFICATE OF CORRECTION

PATENT NO. : 4,110,732
DATED : August 29, 1978
INVENTOR(S) : Wm. M. Jarocha; W.K.O'Neil It is certified that error appears in the above-identified patent and that said Letters Patent are hereby corrected as shown below:

Col. 7, line 19: "effect" should read "effective"

Signed and Sealed this

Nineteenth Day of June 1979

[SEAL]

Attest:

RUTH C. MASON
Attesting Officer

DONALD W. BANNER
Commissioner of Patents and Trademarks